United States Patent
Yabushita et al.

(10) Patent No.: US 9,899,640 B2
(45) Date of Patent: Feb. 20, 2018

(54) FLAT-SHAPED BATTERY

(75) Inventors: Noriyuki Yabushita, Osaka (JP); Koji Yamaguchi, Osaka (JP); Toshikazu Yoshiba, Osaka (JP)

(73) Assignee: MAXELL HOLDINGS, LTD., Kyoto (JP)

( * ) Notice: Subject to any disclaimer, the term of this patent is extended or adjusted under 35 U.S.C. 154(b) by 1910 days.

(21) Appl. No.: 12/052,514

(22) Filed: Mar. 20, 2008

(65) Prior Publication Data

US 2008/0248384 A1    Oct. 9, 2008

(30) Foreign Application Priority Data

Mar. 20, 2007 (JP) .................................. 2007-072430

(51) Int. Cl.
*H01M 2/08* (2006.01)
*H01M 2/04* (2006.01)
*H01M 2/02* (2006.01)

(52) U.S. Cl.
CPC ....... *H01M 2/0465* (2013.01); *H01M 2/0222* (2013.01); *H01M 2/08* (2013.01)

(58) Field of Classification Search
CPC ..... H01M 2/0465; H01M 2/0222; H01M 2/08
(Continued)

(56) References Cited

U.S. PATENT DOCUMENTS 4,333,995 A * 6/1982 Ishida et al. ................... 429/172
5,919,586 A * 7/1999 Springstead ........ H01M 2/0222
429/164

(Continued)

FOREIGN PATENT DOCUMENTS

JP  4-341756 A  11/1992
JP  7-57706 A   3/1995
(Continued)

*Primary Examiner* — Lisa S Park
(74) *Attorney, Agent, or Firm* — Birch, Stewart, Kolasch & Birch LLP

(57) ABSTRACT

A flat-shaped battery of the present invention includes an outer can that is open upward, a sealing can that is open downward, and a gasket that is placed between the outer can and the sealing can to seal the space between them. The outer can includes a base plate and a cylindrical surrounding wall. The surrounding wall of the outer can includes a straight portion that extends upward and perpendicular to the base plate. The sealing can includes a housing in the form of an inverted dish, a flange that projects outward from a lower end of the opening of the housing, and a single outer surrounding wall that extends downward from an outside edge of the flange so as to be perpendicular to the flange. The outer surrounding wall of the sealing can is arranged perpendicular to the base plate of the outer can. The gasket includes a base that receives a lower end of the outer surrounding wall of the sealing can, and an outer cylindrical wall that extends upward from the base and is disposed between the surrounding wall of the outer can and the outer surrounding wall of the sealing can. The surrounding wall of the outer can has a curved edge such that the surrounding wall at the opening of the outer can is bent toward an axis of the outer can and positioned laterally with respect to the outer surrounding wall of the sealing can. The curved edge presses an upper end of the outer cylindrical wall of the gasket against an upper end of the outer surrounding wall of the sealing can.

3 Claims, 6 Drawing Sheets

(58) Field of Classification Search
USPC .......................................................... 429/162
See application file for complete search history.

(56) References Cited

U.S. PATENT DOCUMENTS

| | | | |
|---|---|---|---|
| 6,761,995 B2 * | 7/2004 | Uyama | H01M 2/0222 |
| | | | 429/171 |
| 2003/0186118 A1 | 10/2003 | Uyama et al. | |
| 2005/0031952 A1 * | 2/2005 | Hayashi et al. | 429/185 |
| 2008/0076024 A1 * | 3/2008 | Janmey | H01M 2/0207 |
| | | | 429/185 |

FOREIGN PATENT DOCUMENTS

| | | | |
|---|---|---|---|
| JP | 7057706 * | 3/1995 | H01M 2/04 |
| JP | 3399801 B2 | 2/2003 | |
| JP | 2003-68254 A | 3/2003 | |
| JP | 2003-151511 A | 5/2003 | |
| WO | WO-02/13290 A1 | 2/2002 | |

* cited by examiner

FLAT-SHAPED BATTERY

BACKGROUND OF THE INVENTION

1. Field of the Invention

The present invention relates to a flat-shaped battery such as a button-type battery or a coin-type battery.

2. Description of Related Art

WO 02/013290 and JP 2003-151511 A disclose a flat-shaped battery including a dish-shaped positive electrode can (outer can) that is open upward, a dish-shaped negative electrode can (sealing can) that is open downward, and a gasket. In this flat-shaped battery, the edge of the positive electrode can and the edge of the negative electrode can are joined by caulking with the gasket interposed between them, thereby sealing the space between the positive electrode can and negative electrode can with the gasket. The flat-shaped battery disclosed in these documents uses the negative electrode can that includes a housing in the form of an inverted shallow dish for housing an electrode material (negative electrode material), and a first outer surrounding wall extending downward from the housing. Moreover, the lower end of the opening of the housing projects outward to form a flange, and a second outer surrounding wall is continuously formed at the outside edge of the flange. The second outer surrounding wall is folded back and joined together, so that double (inner and outer) walls are provided. The gasket is sandwiched between a surrounding wall of the positive electrode can and the second outer surrounding wall of the negative electrode can to seal the space between them.

The above flat-shaped battery is required to have a higher capacity. Therefore, it is necessary to increase the amount of an electrode material or electrolyte contained in the battery can of the flat-shaped battery. However, since the outside dimensions of the flat-shaped battery are predetermined, the battery capacity should be improved within the predetermined dimensions. One possible approach to this problem is to reduce the wall thickness of the battery can. To achieve an even higher capacity the outer surrounding wall of the negative electrode can may be formed of a single wall without folding, as disclosed in JP 7 (1995)-57706 A, JP 2003-68254 A, JP 4 (1992)-341756 A, and Japanese Patent No. 3399801.

However, the strength of the outer surrounding wall of the negative electrode can in the thickness direction is lower in the case of a single wall than in the case of a double wall. Therefore, when the surrounding wall of the positive electrode can is bent toward the axis of the positive electrode can by caulking, force is exerted on the outer surrounding wall of the negative electrode can in the thickness direction, and the outer surrounding wall can be easily bent toward the axis of the negative electrode can. This may result in a gap between the outer surrounding wall of the negative electrode can and the gasket, and thus cause a leakage of the electrolyte.

SUMMARY OF THE INVENTION

The present invention provides a flat-shaped battery that can ensure sealing of the space between an outer can and a sealing can with a gasket, even if the outer surrounding wall of the sealing can is formed of a single wall so as to achieve a higher capacity of the battery.

A flat-shaped battery of the present invention includes an outer can that is open upward, a sealing can that is open downward, and a gasket that is placed between the outer can and the sealing can to seal a space between them. The outer can includes a base plate and a cylindrical surrounding wall. The surrounding wall of the outer can includes a straight portion that extends upward and perpendicular to the base plate. The sealing can includes a housing in the form of an inverted dish, a flange that projects outward from a lower end of the opening of the housing, and a single outer surrounding wall that extends downward from an outside edge of the flange so as to be perpendicular to the flange. The outer surrounding wall of the sealing can is arranged perpendicular to the base plate of the outer can. The gasket includes a base that receives a lower end of the outer surrounding wall of the sealing can, and an outer cylindrical wall that extends upward from the base and is disposed between the surrounding wall of the outer can and the outer surrounding wall of the sealing can. The surrounding wall of the outer can has a curved edge such that the surrounding wall at the opening of the outer can is bent toward an axis of the outer can and positioned laterally with respect to the outer surrounding wall of the sealing can. The curved edge presses an upper end of the outer cylindrical wall of the gasket against an upper end of the outer surrounding wall of the sealing can.

DETAILED DESCRIPTION OF THE INVENTION

Figure 1A:
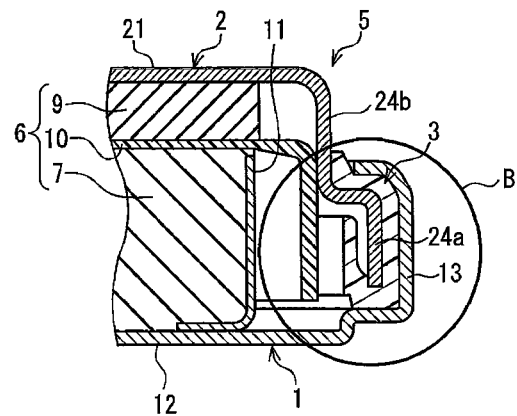
FIG. 1A is a partially cross-sectional view showing an example of a flat-shaped battery of the present invention.
Figure 1B:
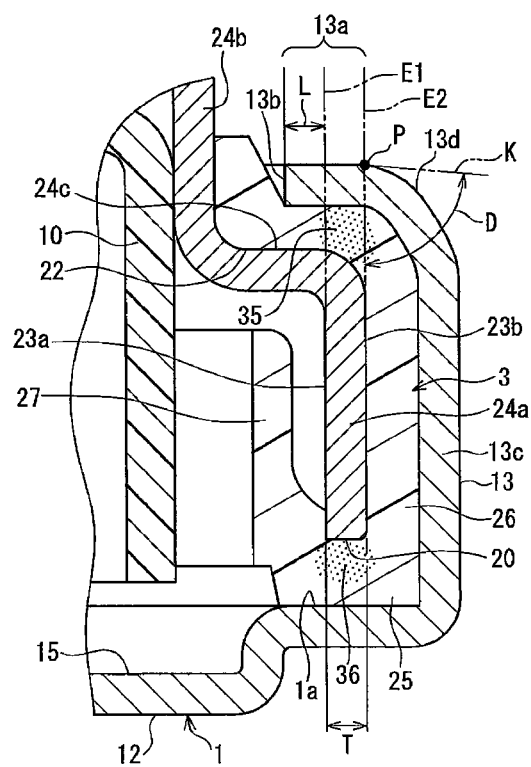
FIG. 1B is an enlarged view of a portion B in FIG. 1A.
Figure 1C:
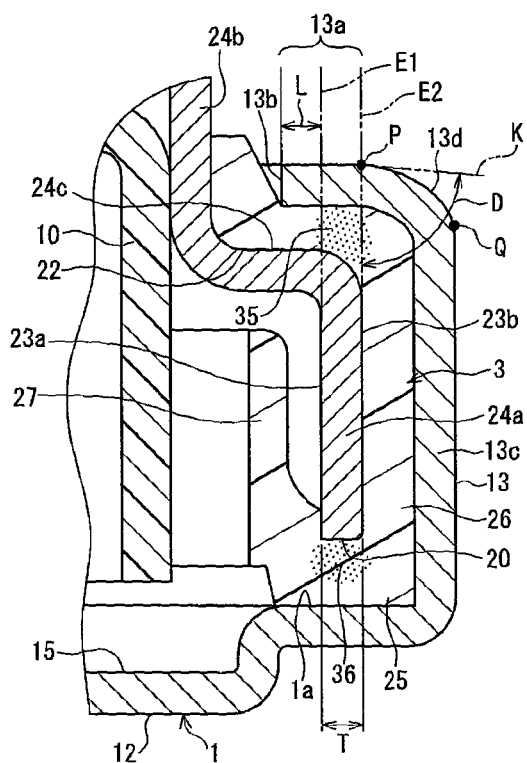
FIG. 1C is an enlarged view showing another embodiment of the portion B in FIG. 1A.

First, embodiments of a flat-shaped battery of the present invention will be described based on FIGS. 1A, 1B, and 1C. FIG. 1A is a partially cross-sectional view showing an example of a flat-shaped battery of the present invention. FIG. 1B is an enlarged view of a portion B in FIG. 1A. FIG. 1C is an enlarged view showing another embodiment of the portion B in FIG. 1A.

A first feature of the flat-shaped battery of the present invention is as follows. The flat-shaped battery includes an outer can 1 that is open upward, a sealing can 2 that is open downward, and a gasket 3 that is placed between the outer can 1 and the sealing can 2 to seal the space between them. The outer can 1 includes a base plate 12 and a cylindrical surrounding wall 13. The surrounding wall 13 includes a straight portion 13c that extends upward and perpendicular to the base plate 12. The sealing can 2 includes a housing 21 in the form of an inverted dish, a flange 24c that projects outward from a lower end 22 of the opening of the housing 21, and a single outer surrounding wall 24a that extends downward from the outside edge of the flange 24c so as to be perpendicular to the flange 24c. The outer surrounding wall 24a is arranged perpendicular to the base plate 12 of the outer can 1.

The gasket 3 includes a base 25 that receives a lower end 20 of the outer surrounding wall 24a of the sealing can 2, and an outer cylindrical wall 26 that extends upward from the base 25 and is disposed between the surrounding wall 13 of the outer can 1 and the outer surrounding wall 24a of the sealing can 2.

The surrounding wall 13 of the outer can 1 has a curved edge 13a such that the surrounding wall 13 at the opening of the outer can 1 is bent toward the axis of the outer can 1 and positioned laterally with respect to the outer surrounding wall 24a of the sealing can 2. The curved edge 13a presses the upper end of the outer cylindrical wall 26 of the gasket 3 against the upper end of the outer surrounding wall 24a of the sealing can 2.

In addition to the first feature, a second feature of the flat-shaped battery of the present invention is as follows. An end position 13b of the curved edge 13a of the surrounding wall 13 of the outer cam 1 is located closer to the axis of the outer can 1 than an inner surface 23a of the outer surrounding wall 24a of the sealing can 2. Moreover, a lateral distance L from a first virtual extension surface E1 of the inner surface 23a of the outer surrounding wall 24a to the end position 13b of the curved edge 13a is set within the range of 10% to 300% of the thickness T of the outer surrounding wall 24a.

Further, at a point P on a curve where a second virtual extension surface E2 of an outer surface 23b of the outer surrounding wall 24a intersects the outer surface of the surrounding wall 13, an inclination angle D between the second virtual extension surface E2 and a tangential virtual plane K contacting the point P is set within the range of 65° to 105° when the angle is measured from the second virtual extension surface E2 upward.

In addition to either the first or the second feature, a third feature of the flat-shaped battery of the present invention is as follows. As shown in FIG. 1C, a bend position Q at which the straight portion 13c of the surrounding wall 13 starts to be bent is located higher than the lower end 22 of the opening of the housing 21.

In addition to any of the first, second, and third features, a fourth feature of the flat-shaped battery of the present invention is as follows. The outer can 1 includes a recess 15 where a central portion of the base plate 12 curves downward and an annular peripheral portion 1a surrounding the recess 15. The base 25 of the gasket 3 is in contact with the peripheral portion 1a.

In addition to any of the first, second, third, and fourth features, a fifth feature of the flat-shaped battery of the present invention is as follows. The outer surrounding wall 24a of the sealing can 2 is tapered to be thinner at the opening. However, the outer surrounding wall 24a is not tapered in FIGS. 1A to 1C.

The flat-shaped battery with the above features of the present invention can exhibit the following effects. In the flat-shaped battery of the present invention, the outer surrounding wall 24a of the sealing can 2 is formed of a single wall. Therefore, the internal volume of the battery can be increased without changing the outside dimensions of the battery. This can increase the amount of an electrode material or electrolyte contained in the battery, and thus improve the battery capacity. Moreover, the curved edge 13a of the surrounding wall 13 of the outer can 1 is positioned laterally and presses the upper end of the outer cylindrical wall 26 of the gasket 3 against the upper end of the outer surrounding wall 24a of sealing can 2 (i.e., the outer can 1 and the sealing can 2 are joined by caulking). Accordingly the upper end of the outer cylindrical wall 26 of the gasket 3 is compressed and sandwiched between the curved edge 13a of the outer can 1 and the upper end of the outer surrounding wall 24a of the sealing can 2 while the base 25 of the gasket 3 is compressed and sandwiched between the lower end 20 of the outer surrounding wall 24a of the sealing can 2 and the base plate 12 of the outer can 1. Thus, both the space between the curved edge 13a of the outer can 1 and the outer surrounding wall 24a of the sealing can 2, and the space between the outer surrounding wall 24a of the sealing can 2 and base plate 12 of the outer can 1 are reliably sealed with the gasket 3. The caulking pressure is applied mainly in the vertical direction of the outer surrounding wall 24a of the sealing can 2. Therefore, even if the outer surrounding wall 24a of the sealing can 2 is formed of a single wall and does not have sufficiently high strength in the thickness (lateral) direction, it can be prevented from bending in the thickness direction due to the caulking pressure. This makes it possible to suppress a decrease in the sealing action of the gasket 3, so that the space between the outer can 1 and the sealing can 2 can be reliably sealed with the gasket 3.

In the present invention, the lateral distance L from the first virtual extension surface E1 of the inner surface 23a of the outer surrounding wall 24a to the end position 13b of the curved edge 13a is set within the range of 10% to 300% of the thickness T of the outer surrounding wall 24a. Moreover, at the point P on the curve where the second virtual extension surface E2 of the outer surface 23b of the outer surrounding wall 24a intersects the outer surface of the surrounding wall 13, the inclination angle D between the second virtual extension surface E2 and the tangential virtual plane K contacting the point P is set within the range of 65° to 105° when the angle is measured from the second virtual extension surface E2 upward. With this configuration, the caulking pressure that acts on the curved edge 13a of the surrounding wall 13 can be reliably applied in the vertical direction of the outer surrounding wall 24a, so that the space between the outer can 1 and the sealing can 2 can be more reliably sealed with the gasket 3.

In the present invention, as shown in FIG. 1C, the bend position Q of the surrounding wall 13 of the outer can 1 is located higher than the lower end 22 of the opening of the housing 21. With this configuration, when the surrounding wall 13 is bent by caulking, the pressure is not likely to be applied to the outer surrounding wall 24a of the sealing can 2 via the gasket 3. Thus, the outer surrounding wall 24a can be further prevented from bending in the thickness direction, and a decrease in the sealing action of the gasket 3 can be reliably suppressed.

In the present invention, the central portion of the base plate 12 of the outer can 1 curves downward, resulting in the recess 15. The strength of the base plate 12 is increased due to the presence of the recess 15. Therefore, even if the caulking pressure is applied to the peripheral portion 1a around the recess 15, the base plate 12 is not easily deformed. In this regard, a decrease in the sealing action of the gasket 3 also can be reliably suppressed.

In the present invention, when the outer surrounding wall 24a of the sealing can 2 is tapered to be thinner at the opening, the lower end 20 of the outer surrounding wall 24a is pressed against the base 25 of the gasket 3 with a strong force. Thus, the space between the lower end 20 of the outer surrounding wall 24a and the base plate 12 of the outer can 1 can be reliably sealed with the gasket 3.

Figure 2:
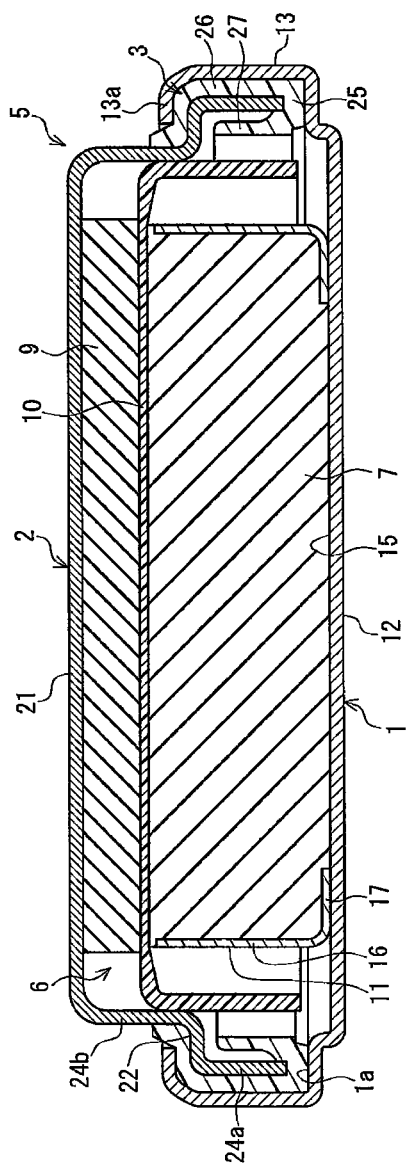
FIG. 2 is a cross-sectional view showing an example of a flat-shaped battery of the present invention.
Figure 3:
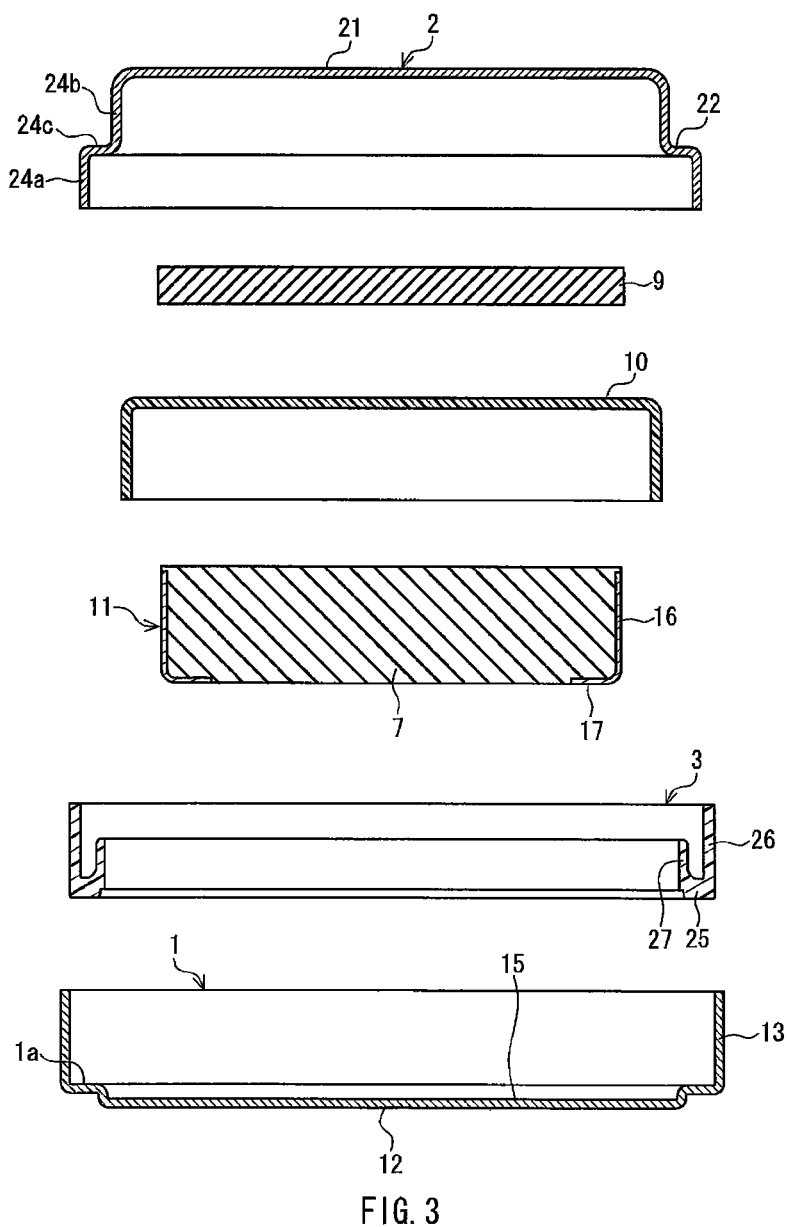
FIG. 3 is an exploded cross-sectional view of the flat-shaped battery in FIG. 2.
Figure 4:
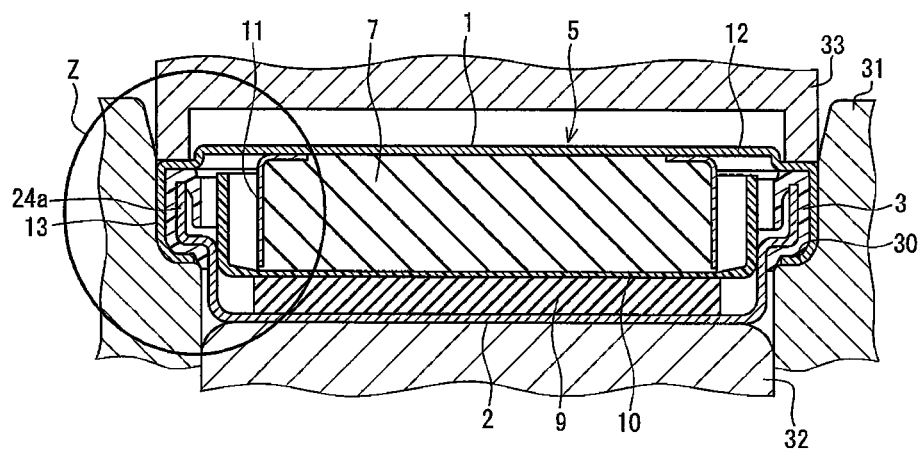
FIG. 4 is a cross-sectional view showing an example of a manufacturing process of a flat-shaped battery of the present invention.
Figure 5:
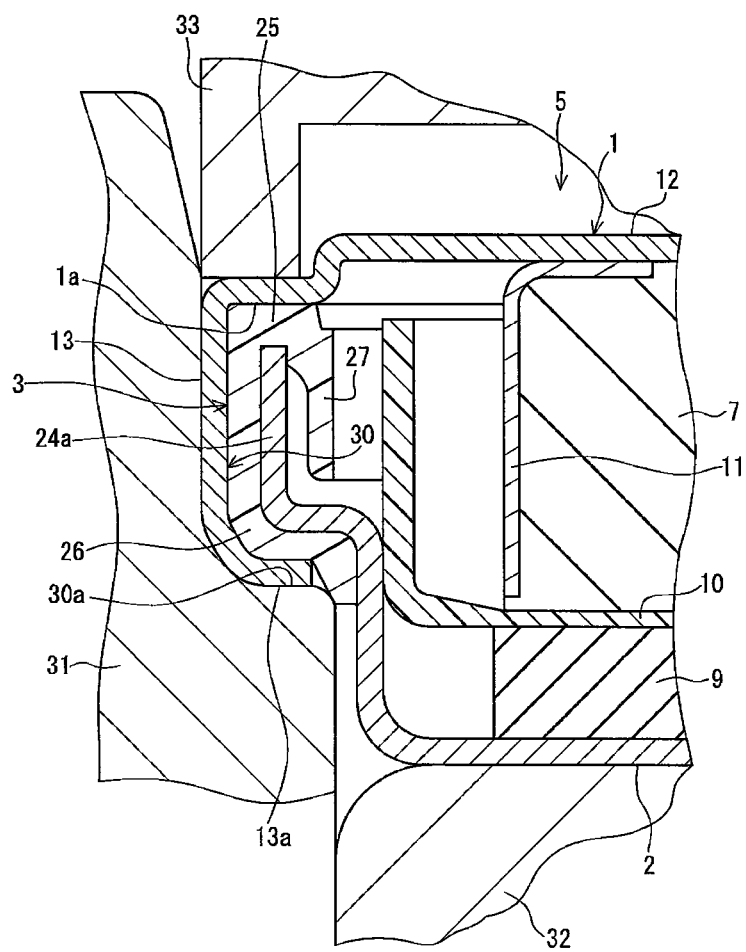
FIG. 5 is an enlarged view of a portion Z in FIG. 4.

Hereinafter, the embodiments of the flat-shaped battery of the present invention will be described more specifically with reference to FIGS. 1A, 1B, 1C, and 2 to 5. FIG. 2 is a cross-sectional view showing an example of the flat-shaped battery. FIG. 3 is an exploded cross-sectional view of the flat-shaped battery in FIG. 2. FIG. 4 is a cross-sectional view showing an example of a manufacturing process of the flat-shaped battery. FIG. 5 is an enlarged view of a portion Z in FIG. 4. In FIGS. 1A, 1B, 1C, and 2 to 5, the same components are denoted by the same reference numerals, and the explanation will not be repeated. In the following description, the outer can 1 is identified as a positive electrode can 1, and the sealing can 2 is identified as a negative electrode can 2. In this specification, with respect to the vertical direction of the battery, the position of the sealing can (negative electrode can) 2 is defined as an upper side, and the position of the outer can (positive electrode can) 1 is defined as a lower side. However, the battery is upside down in FIGS. 4 and 5.

As shown in FIGS. 1A, 1B and 2, the flat-shaped battery of the present invention includes the following: the positive electrode can (outer can) 1 that is open upward; the negative electrode can (sealing can) 2 that is open downward; the annular gasket 3 that is placed between the positive electrode can 1 and the negative electrode can 2 to seal the space between them; and an electric power generating element 6 and a nonaqueous electrolyte that are contained in a battery can 5 composed of the positive electrode can 1, the negative electrode can 2, and the gasket 3. This general shape of the battery is flat like a coin.

While the electric power generating element 6 and the nonaqueous electrolyte are contained in the battery can 5, the negative electrode can 2 is caulked to the inside edge of the opening of the positive electrode can 1 via the gasket 3, so that the space between the positive electrode can 1 and the negative electrode can 2 is (hermetically) sealed (FIG. 2). Moreover, the positive electrode can 1 is insulated from the negative electrode can 2 by the gasket 3. The outer diameter of the battery is, e.g., 24.5 mm, and the entire thickness is, e.g., 5.0 mm.

The electric power generating element 6 includes a positive electrode material (electrode material) 7 obtained by forming a positive active material or the like into a disk shape, a negative electrode material (electrode material) 9 obtained by forming a negative active material such as lithium or lithium alloy into a disk shape, and a separator 10 made of nonwoven fabric. As shown in FIG. 2, the negative electrode material 9 is disposed on the upper side of the positive electrode material 7 via the separator 10. A positive electrode ring 11 is attached to the outer surface of the positive electrode material 7. The positive electrode ring 11 may be made of stainless steel with required rigidity and conductivity.

Before the assembly of the battery, the positive electrode can 1 in the blank state is a press-molded article in the form of a round dish, as shown in FIG. 3. The cylindrical surrounding wall 13 is continuously formed on the outside edge of the base plate 12 of the positive electrode can 1. The surrounding wall 13 is substantially perpendicular to the peripheral portion 1a of the base plate 12. The central portion of the base plate 12 curves downward, resulting in the recess 15. The recess 15 receives both the positive electrode material 7 and the positive electrode ring 11 (FIG. 2). Moreover, the recess 15 is surrounded by the annular peripheral portion 1a. The bottom of the recess 15 and the upper surface of the peripheral portion 1a are made flat.

The positive electrode ring 11 includes a cylindrical member 16 and an annular flange 17 that are integrally formed as a single component. The cylindrical member 16 has open ends and comes into contact with the side of the positive electrode material 7. The annular flange 17 extends horizontally from the lower end of the cylindrical member 16 to the axis of the positive electrode ring 11. Since the upper end of the cylindrical member 16 is open, the positive electrode material 7 can freely expand upward during discharge.

The negative electrode can 2 is a press-molded article in the form a round dish and includes the housing 21, the flange 24c, and the single outer surrounding wall 24a that are integrally formed as a single component. The housing 21 is arranged on the upper side of the negative electrode can 2 and has an inverted shallow dish shape for housing the negative electrode material 9. The flange 24c projects outward from the lower end 22 of the opening of the housing 21. The outer surrounding wall 24a extends downward from the outside edge of the flange 24c so as to be perpendicular to the flange 24c. The negative electrode can 2 has a double-walled structure including an inner surrounding wall 24b of the housing 21 and the outer surrounding wall 24a. The outer surrounding wall 24a is arranged substantially perpendicular to the peripheral portion 1a of the base plate 12 of the positive electrode can 1.

The gasket 3 is made of a resin composition that includes polyphenylene sulfide (PPS) as the main component and an olefin elastomer. The gasket 3 includes the ring-shaped base 25, the outer cylindrical wall 26, and an inner cylindrical wall 27 that are integrally formed as a single component. The outer cylindrical wall 26 extends upward from the outside edge of the base 25 and is disposed between the surrounding wall 13 of the positive electrode can 1 and the outer surrounding wall 24a of the negative electrode can 2. The inner cylindrical wall 27 extends upward from the inside edge of the base 25. As shown in FIG. 1B, the base 25 of the gasket 3 receives the lower end 20 of the outer surrounding wall 24a of the negative electrode can 2 while being in contact with the peripheral portion 1a of the base plate 12 of the positive electrode can 1. The thickness of the outer cylindrical wall 26 of the gasket 3 is substantially constant in the vertical direction.

The positive electrode material 7 includes a manganese dioxide as a positive active material, and may be obtained by the following manner. A positive electrode mixture is prepared by mixing the manganese dioxide with graphite, a tetrafluoroethylene-hexafluoropropylene copolymer, and hydroxypropylcellulose. After the positive electrode ring 11 is set in a predetermined die, the positive electrode mixture is filled into the die and subjected to press-molding. The resultant molded material is heated and formed into a disk shape. The separator 10 is made of nonwoven fabric using polybutylene terephthalate fibers and impregnated with the nonaqueous electrolyte. The nonaqueous electrolyte is a solution obtained by dissolving $LiClO_4$ in a solvent containing propylene carbonate and 1,2-dimethoxyethane. The thickness of the separator 10 is, e.g., about 0.3 to 0.4 mm.

For the assembly of the battery, the components shown in FIG. 3 are assembled upside down. The positive electrode ring 11 is attached to the positive electrode material 7 beforehand. The gasket 3 is fitted around the edge of the opening of the negative electrode can 2, and then the negative electrode material 9 is fixed to the inner surface of the housing 21 with a conductive adhesive or the like. Subsequently, the separator 10 and the positive electrode material 7 are arranged on the upper side of the negative electrode material 9 so that they are superimposed on each other. Next, the nonaqueous electrolyte is injected into the negative electrode can 2. Thereafter, the positive electrode can 1 is placed over the negative electrode can 2, and the negative electrode can 2 and the gasket 3 are inserted into the positive electrode can 1. Then, the surrounding wall 13 at the opening of the positive electrode can 1 is bent toward the axis of the positive electrode can 1, and the positive electrode can 1 and the negative electrode can 2 are joined by caulking with the gasket 3 interposed between them. Thus, the assembly of the battery is completed (FIG. 2).

The above caulking process may be performed using a caulking die. As shown in FIG. 4, the caulking die includes a sealing die 31 with a curved surface 30 for bending the surrounding wall 13 at the opening of the positive electrode can 1 toward the axis of the positive electrode can 1, a knockout pin 32 that passes through the sealing die 31 and is movable in the vertical direction, and an upper sealing punch 33 that is located opposite to the knockout pin 32 and is movable in the vertical direction.

First, the knockout pin 32 is raised, and the battery can 5 is placed on the upper surface of the knockout pin 32 with the negative electrode can 2 facing down. Then, the upper sealing punch 33 is brought into contact with the base plate 12 of the positive electrode can 1, so that the battery can 5 is sandwiched between the knockout pin 32 and the upper sealing punch 33. In this state, when the knockout pin 32 and the upper sealing punch 33 are moved downward, the surrounding wall 13 at the opening of the positive electrode can 1 is bent along the curved surface 30 of the sealing die 31 and curled toward the axis of the positive electrode can 1 (FIG. 5). Moreover, the curved edge 13*a* of the surrounding wall 13 of the positive electrode can 1 is forced against a lower portion 30*a* of the curved surface 30 of the sealing die 31. Consequently the curved edge 13*a* is positioned laterally (i.e., in the direction substantially perpendicular) with respect to the outer surrounding wall 24*a* of the negative electrode can 2. When the curved edge 13*a* is formed into the lateral position, it presses the upper end of the outer cylindrical wall 26 of the gasket 3 against the upper end of the outer surrounding wall 24*a* of the negative electrode can 2 in the vertical direction (FIG. 1B).

With the application of the pressure, a portion 35 (FIG. 1B) of the outer cylindrical wall 26 of the gasket 3 sandwiched between the curved edge 13*a* of the positive electrode can 1 and the upper end of the outer surrounding wall 24*a* of the negative electrode can 2 is compressed and deformed in the vertical direction. As a result, the sandwiched portion 35 is brought into intimate contact with the curved edge 13*a* and the upper end of the outer surrounding wall 24*a*. Moreover, the lower end 20 of the outer surrounding wall 24*a* is put into the base 25 of the gasket 3, so that a portion 36 (FIG. 1B) of the base 25 of the gasket 3 sandwiched between the peripheral portion 1*a* of the base plate 12 and the lower end 20 of the outer surrounding wall 24*a* is compressed and deformed in the vertical direction. As a result, the sandwiched portion 36 is brought into intimate contact with the peripheral portion 1*a* and the lower end 20 of the outer surrounding wall 24*a*. Thus, both the space between the curved edge 13*a* of the positive electrode can 1 and the upper end of the outer surrounding wall 24*a* of the negative electrode can 2, and the space between the lower end 20 of the outer surrounding wall 24*a* of the negative electrode can 2 and the peripheral portion 1*a* of the base plate 12 of the positive electrode can 1 are reliably sealed with the gasket 3.

After the caulking process is finished, as shown in FIGS. 1A and 1B, the end position 13*b* of the curved edge 13*a* of the surrounding wall 13 of the positive electrode can 1 is located closer to the axis of the positive electrode can 1 (i.e., to the left side of FIG. 1B) than the inner surface 23*a* of the outer surrounding wall 24*a* of the negative electrode can 2. The lateral distance L from the first virtual extension surface E1 of the inner surface 23*a* of the outer surrounding wall 24*a* to the end position 13*b* of the curved edge 13*a* is set within the range of 10% to 300% of the thickness T of the outer surrounding wall 24*a*. Specifically the lateral distance L is, e.g., in the range of 0.05 to 0.75 mm.

If the lateral distance L is smaller than 10% of the thickness T of the outer surrounding wall 24*a*, the pressure applied by the curved edge 13*a* is not easily transferred to the upper end of the outer surrounding wall 24*a*, and the sealing action of the gasket 3 is excessively reduced. If the lateral distance L is larger than 300% of the thickness T of the outer surrounding wall 24*a*, the end position 13*b* of the curved edge 13*a* is too close to the housing 21 of the negative electrode can 2. Thus, the end of the positive electrode can 1 may come into contact with the housing 21 of the negative electrode can 2.

As shown in FIG. 1B, at the point P on the curve where the second virtual extension surface E2 of the outer surface 23*b* of the outer surrounding wall 24*a* intersects the outer surface of the surrounding wall 13, the inclination angle D between the second virtual extension surface E2 and the tangential virtual plane K contacting the point P is set within the range of 65° to 105° when the angle is measured from the second virtual extension surface E2 upward (i.e., in the counterclockwise direction of FIG. 1B). If the inclination angle D is smaller than 65° or larger than 105°, the pressure applied by the curved edge 13*a* is not easily transferred to the upper end of the outer surrounding wall 24*a*. Moreover, the pressure is applied to the outer surrounding wall 24*a* in the thickness direction, and thus the outer surrounding wall 24*a* may be deformed. It is more preferable that the inclination angle D is in the range of 80° to 100°. When the inclination angle D is larger than 90°, the curved edge 13*a* is a downward slope such that the end position becomes lower.

As shown in FIG. 1C, after the caulking process is finished, the bend position Q at which the straight portion 13*c* of the surrounding wall 13 starts to be bent is located higher than the lower end 22 of the opening of the housing 21. With this configuration, when the surrounding wall 13 is bent by the curved surface 30 of the sealing die 31 during caulking, it is possible to effectively prevent the application of the lateral pressure to the outer surrounding wall 24*a* of the negative electrode can 2 via the gasket 3. The inner radius of a curved portion 13*d* of the surrounding wall 13 is, e.g., in the range of 0.2 to 0.7 mm.

The space between the straight portion 13*c* of the surrounding wall 13 and the outer surface 23*b* of the outer surrounding wall 24*a* is set to be slightly smaller than the width of the outer cylindrical wall 26 of the gasket 3. This makes it difficult to exert an elastic restoring force of the outer cylindrical wall 26 of the gasket 3 on the outer surrounding wall 24*a* of the negative electrode can 2. Accordingly, the caulking pressure is applied mainly in the vertical direction of the outer surrounding wall 24*a* of the negative electrode can 2.

When the outer surrounding wall 24*a* of the negative electrode can 2 is tapered to be thinner at the opening, the lower end 20 of the outer surrounding wall 24*a* is deeply embedded into the base 25 of the gasket 3, and thus firmly pressed against the base 25. Therefore, the space between the lower end 20 of the outer surrounding wall 24*a* and the peripheral portion 1*a* of the base plate 12 of the positive electrode can 1 is reliably sealed with the gasket 3. In such a case, the thickness T (FIGS. 1B and 1C) of the outer surrounding wall 24*a* is set to the thickness of the upper end of the outer surrounding wall 24*a*.

In this embodiment, as shown in FIG. 2, the negative electrode can 2 and the gasket 3 are inserted into the positive electrode can 1. However, the positive and negative electrode cans 1, 2 may be configured so that the positive electrode can 1 and the gasket 3 are inserted into the negative electrode can 2. The gasket 3 may have any shape other than that shown in FIG. 2, as long as it can be placed between the positive electrode can 1 and the negative electrode can 2 to seal the space between them.

The invention may be embodied in other forms without departing from the spirit or essential characteristics thereof. The embodiments disclosed in this application are to be considered in all respects as illustrative and not limiting. The scope of the invention is indicated by the appended claims rather than by the foregoing description, and all changes which come within the meaning and range of equivalency of the claims are intended to be embraced therein.

What is claimed is:

1. A flat-shaped battery comprising:
an outer can that is open upward;
a sealing can that is open downward; and
a gasket that is placed between the outer can and the sealing can to seal a space between them,
wherein the outer can comprises a base plate and a cylindrical surrounding wall, and the base plate comprises a recess where a central portion of the base plate curves downward, and an annular peripheral portion surrounding the recess,
the surrounding wall of the outer can comprises a straight portion that extends upward and perpendicular to the base plate,
the sealing can comprises a housing in the form of an inverted dish, a flange that projects outward from a lower end of an opening of the housing, and a single outer surrounding wall without folding that extends downward from an outside edge of the flange so as to be perpendicular to the flange,
the outer surrounding wall of the sealing can is arranged perpendicular to the base plate of the outer can and is tapered so that a thickness of the outer surrounding wall of the sealing can becomes smaller toward an opening of the sealing can,
the gasket comprises a base that receives a lower end of the outer surrounding wall of the sealing can, and an outer cylindrical wall that extends upward from the base and is disposed between the surrounding wall of the outer can and the outer surrounding wall of the sealing can, and the base of the gasket is in direct contact with the base plate of the outer can,
the surrounding wall of the outer can has a curved edge such that the surrounding wall at an opening of the outer can is bent toward an axis of the outer can and positioned laterally with respect to the outer surrounding wall of the sealing can,
the curved edge presses an upper end of the outer cylindrical wall of the gasket against an upper end of the outer surrounding wall of the sealing can,
an end position of the curved edge of the surrounding wall of the outer can is located closer to the axis of the outer can than an inner surface of the outer surrounding wall of the sealing can,
a lateral distance from a first virtual extension surface of the inner surface of the outer surrounding wall of the sealing can to the end position of the curved edge is set within a range of 10% to 300% of a thickness of the outer surrounding wall of the sealing can, and
at a point on a curve where a second virtual extension surface of an outer surface of the outer surrounding wall of the sealing can intersects an outer surface of the surrounding wall of the outer can, an inclination angle between the second virtual extension surface and a tangential virtual plane contacting the point is set within a range of 65° to 105° when the angle is measured from the second virtual extension surface upward.

2. The flat-shaped battery according to claim 1, wherein a bend position at which the straight portion of the surrounding wall of the outer can starts to be bent is located higher than the lower end of the opening of the housing.

3. A flat-shaped battery comprising:
an outer can that is open upward;
a sealing can that is open downward; and
a gasket that is placed between the outer can and the sealing can to seal a space between them,
wherein the outer can comprises a base plate and a cylindrical surrounding wall, and the base plate comprises a recess where a central portion of the base plate curves downward, and an annular peripheral portion surrounding the recess,
the surrounding wall of the outer can comprises a straight portion that extends upward and perpendicular to the base plate,
the sealing can comprises a housing in the form of an inverted dish, a flange that projects outward from a lower end of an opening of the housing, and a single outer surrounding wall without folding that extends downward from an outside edge of the flange so as to be perpendicular to the flange,
the outer surrounding wall of the sealing can is arranged perpendicular to the base plate of the outer can and is tapered so that a thickness of the outer surrounding wall of the sealing can becomes smaller toward an opening of the sealing can,
the gasket comprises a base that receives a lower end of the outer surrounding wall of the sealing can, and an outer cylindrical wall that extends upward from the base and is disposed between the surrounding wall of the outer can and the outer surrounding wall of the sealing can, and the base of the gasket is in direct contact with the base plate of the outer can,
the surrounding wall of the outer can has a curved edge such that the surrounding wall at an opening of the outer can is bent toward an axis of the outer can and positioned laterally with respect to the outer surrounding wall of the sealing can,
the curved edge presses an upper end of the outer cylindrical wall of the gasket against an upper end of the outer surrounding wall of the sealing can,
an end position of the curved edge of the surrounding wall of the outer can is located closer to the axis of the outer can than an inner surface of the outer surrounding wall of the sealing can,
a lateral distance from a first virtual extension surface of the inner surface of the outer surrounding wall of the sealing can to the end position of the curved edge is set within a range of 10% to 300% of a thickness of the outer surrounding wall of the sealing can,
at a point on a curve where a second virtual extension surface of an outer surface of the outer surrounding wall of the sealing can intersects an outer surface of the surrounding wall of the outer can, an inclination angle between the second virtual extension surface and a tangential virtual plane contacting the point is set within a range of 65° to 105° when the angle is measured from the second virtual extension surface upward, and
a bend position at which the straight portion of the surrounding wall of the outer can starts to be bent is located higher than the lower end of the opening of the housing.

\* \* \* \* \*